United States Patent
Luik et al.

(10) Patent No.: US 6,601,898 B2
(45) Date of Patent: Aug. 5, 2003

(54) COVER DEVICE

(75) Inventors: Klaus Luik, Muehlacker (DE); Paul-Dieter Fengel, Eberdingen (DE); Margret Metzger, Eberdingen-Hochdorf (DE); Hans-Juergen Rehberger, Friolzheim (DE)

(73) Assignee: Dr. Ing. h.c.F. Porsche AG, Weissach (DE)

( * ) Notice: Subject to any disclaimer, the term of this patent is extended or adjusted under 35 U.S.C. 154(b) by 0 days.

(21) Appl. No.: 10/273,143

(22) Filed: Oct. 18, 2002

(65) Prior Publication Data

US 2003/0085583 A1 May 8, 2003

(30) Foreign Application Priority Data

Oct. 19, 2001 (DE) .......................................... 101 51 771

(51) Int. Cl.[7] ................................................ B60R 7/04
(52) U.S. Cl. ...................... 296/37.16; 296/24.1; 296/98
(58) Field of Search ............................ 296/24.1, 37.16, 296/98

(56) References Cited

FOREIGN PATENT DOCUMENTS

| DE | 195 37 768 | 11/1996 |
|----|------------|---------|
| DE | 195 26 666 | 1/1997 |
| DE | 197 07 676 | 2/1998 |

*Primary Examiner*—Joseph D. Pape
*Assistant Examiner*—Lori L Coletta
(74) *Attorney, Agent, or Firm*—Crowell & Moring LLP

(57) ABSTRACT

A cover device for a gap behind a rear seat unit and a vertical partition of a motor vehicle extending in the transverse direction of the vehicle as well as a side paneling consists of plate-shaped elements arranged on each side of a cartridge for a blind. These plate-shaped elements comprise a finger-shaped tongue as well as a rectangular plate, which are constructed in one piece. The plate-shaped elements are deflectable with respect to the cartridge by way of swivelling axes.

12 Claims, 2 Drawing Sheets

COVER DEVICE

This application claims the priority of German Patent Application No. 101 51 771.8, filed Oct. 19, 2001, the disclosure of which is expressly incorporated by reference herein.

BACKGROUND OF THE INVENTION

The present invention relates to a cover device for a gap behind a rear seat unit and a vertical partition of a motor vehicle extending in the transverse direction of the vehicle as well as a side paneling.

DE 195 37 768 C1 discloses a cover device for a motor vehicle cargo space in which the cover device is arranged between a backrest of a rear seat and a cartridge of a housing for a blind.

SUMMARY OF THE INVENTION

An object of the present invention is to provide an improved cover device for a gap in the area of a rear seat unit of a motor vehicle which is easy to mount. The device ensures a precise covering of the space or gap and, when a cartridge carrying the cover device is removed, avoids damage to this cover device.

According to the invention, this object has been achieved by providing that the cover device has at least two plate-shaped elements, one of the elements being linked to a free end of a transversely extending cartridge for a horizontal trunk cover, and the elements being arranged on each side in gaps between a rear seat backrest, the side paneling and a transversely aligned cartridge for the vertical partition.

Among the principal advantages achieved with the present invention are that a gap of a varying width and length behind rear seat unit of a motor vehicle and next to a side paneling is for the most part closed off on each side by a plate-shaped element of the cover device.

For this purpose, the cover device has at least two plate-shaped elements. One element respectively is linked to the free end of a transversely extending cartridge for a horizontal trunk covering. The plate-shaped elements of the device are arranged in gaps between a rear seat unit, a side paneling and a transversely aligned cartridge for the vertical partition. With these plate-shaped elements, the gaps between the rear seat unit, the side paneling and the cartridge for the vertical partition are closed off almost without gaps so that, together with the pulled-out blind for the horizontal trunk covering, a surface is obtained which is closed off for the most part.

When the cartridge for the horizontal blind is not used and is removed, the cover device will not be damaged when placed on the floor due to the plate-shaped elements at the free end of the cartridge being swivellable about a first transversely extending swivelling axis at the cartridge and about a second swivelling axis arranged offset thereto by 90° and extending in the longitudinal direction of the vehicle, between the tongue and the plate-shaped element. As a result of this swivellability of the elements, the cartridge can be set down in an upright manner, whereby the elements can swivel away and are not damaged.

In particular, the plate-shaped elements consist of a finger-shaped tongue extending in the longitudinal direction of the vehicle, between a side of the backrest as well as the side paneling and an adjoining rectangular cover plate between the cartridge and the rear wall of the backrest. Thereby, the gap between the backrest and the side wall of the vehicle is also closed, in which case the additional gap between the rear seat backrest and the cartridge is closed off by a narrow cover strip which is connected with the plate shaped elements. So that a swivellability of the elements with respect to the cartridge is maintained, the cover strip between the plate-shaped elements is separated with respect to the swivelling by means of a depression.

BRIEF DESCRIPTION OF THE DRAWINGS

These and other objects, features and advantages of the present invention will become more readily apparent from the following detailed description of currently preferred configurations thereof when taken in conjunction with the accompanying drawings wherein.

DETAILED DESCRIPTION OF THE DRAWINGS

Figure 1:
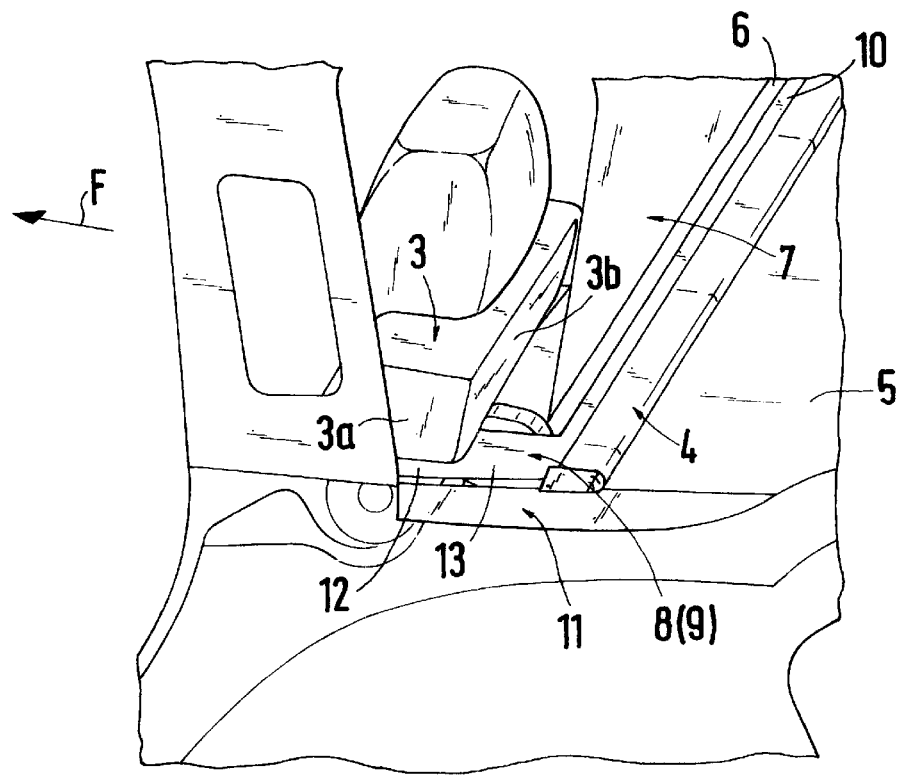
FIG. 1 is a perspective view of the cover device viewed in the driving direction from the left side of the vehicle through a side window opening in the vehicle body.

A cover device 1 for the gaps 2, 2a, 2b, particularly between a rear seat unit 3, a cartridge 4 for a horizontal blind 5 and a cartridge 6 for a vertical partition 7 as well as the side paneling 11 essentially consists of, in each case, a plate-shaped element 8, 9 linked to the end side of the cartridge as well as a transversely extending cover strip 10 between the elements 8 and 9.

Figure 2:
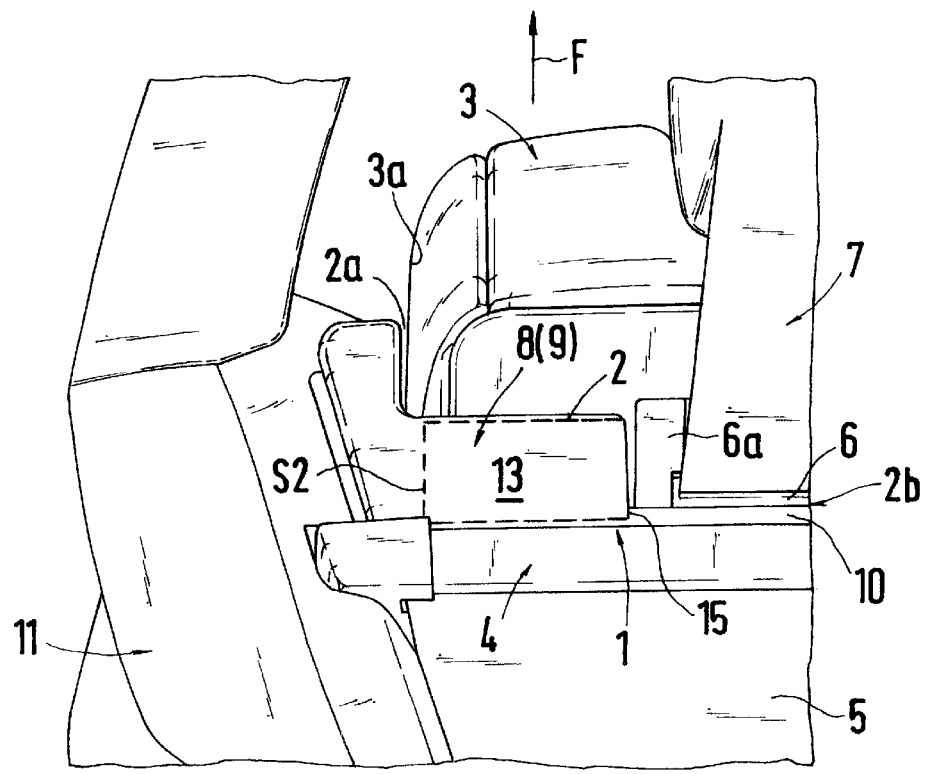
FIG. 2 is a perspective view of the cover device viewed from the rear in the driving direction.
Figure 3:
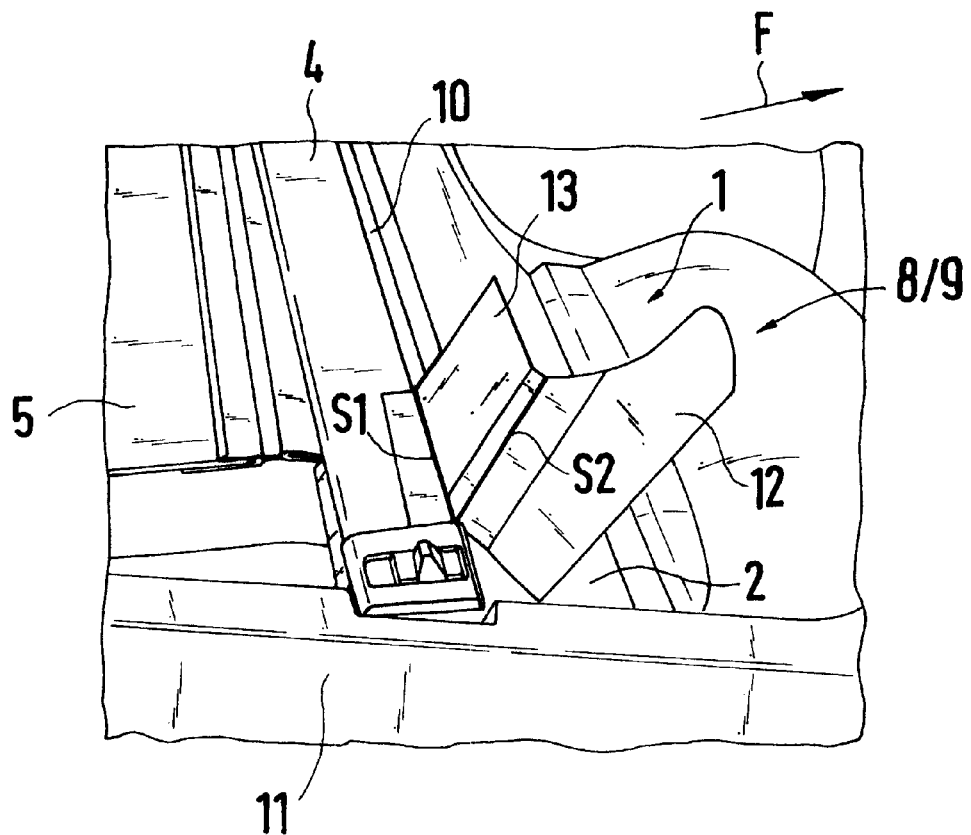
FIG. 3 is a perspective view of the cover device in a partially swivelled position.

As illustrated particularly in FIGS. 1 and 2, the plate-shaped element 8, 9 for covering the gap consists of a finger-shaped oblong narrow tongue 12 and an adjoining rectangular plate 13. The finger-shaped tongue 12 extends in the gap 2a between a side 3a of the rear seat unit 3 and the side paneling 11 of the vehicle. The adjoining rectangular plate 13 extends to the cartridge 4 and closes off the additional gap 2 between the cartridge 4, the side paneling 11 and the cartridge 6 and a head part 6a of the cartridge. Furthermore, a gap 2b between the cartridge 6 and the additional cartridge 4 is closed by the cover strip 10. By way of this cover device 1, gaps 2, 2a and 2b of different sizes, which are arranged in the transverse and the longitudinal direction of the vehicle, are therefore covered in that the cartridge 4 is installed in the vehicle and the plate-shaped elements 8, 9 on each side are correspondingly deposited on the side paneling.

Figure 4:
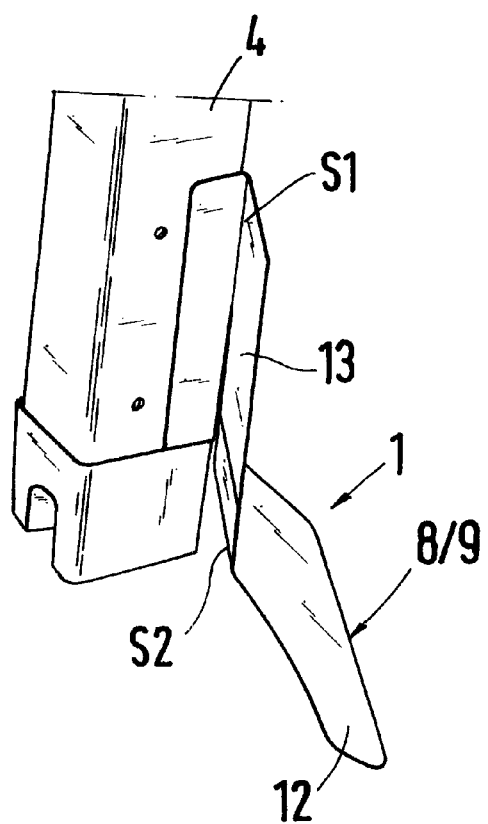
FIG. 4 is an isolated view of the set-up cartridge with the plate-shaped element swivelled in the swivelling axes.

So that, during a removal of the cartridge 4 and the depositing on the floor, the cover device 1 or the projecting plate-shaped elements 8, 9 are not damaged, each element 8, 9 is pivotally connected by way of two swivelling axes S1 and S2. The swivelling axis S1 is provided in the connection area to the cartridge 4, and the additional swivelling axis S2 is arranged to be rotated by 90° between the finger-shaped tongue 12 and the rectangular plate 13. Thereby, as illustrated in detail in FIG. 4, the cartridge 4 can be installed and the plate-shaped elements 8, 9 can elastically swivel away. The swivelling axes S1, S2 can be formed by so-called film hinges. In order to allow the plate-shaped elements 8, 9 to be swivelled without being hindered by the cover strip 10, a depression 15 may be provided between the rectangular plate 13 and the cover strip 10, which depression 15 does not hinder a swivelling of the plate-shaped elements 8, 9.

Although the present invention has been illustrated and described with respect to exemplary embodiment thereof, it should be understood by those skilled in the art that the foregoing and various other changes, omission and additions may be made therein and thereto, without departing from the spirit and scope of the present invention. Therefore, the present invention should not be understood as limited to the specific embodiment set out above but to include all possible embodiments which can be embodied within a scope encompassed and equivalent thereof with respect to the feature set out in the appended claims.

We claim:

1. Cover device for a gap behind a rear seat unit and a vertical partition of a motor vehicle extending in a transverse vehicle direction as well as a side paneling, comprising at least two plate-shaped elements, one of the elements being linked to a free end of a transversely extending cartridge for a horizontal trunk cover, and the elements being arranged on each side in gaps between a rear seat backrest, the side paneling and a transversely aligned cartridge for the vertical partition.

2. Cover device according to claim 1, wherein the plate-shaped elements are swivellable at a free end of the cartridge about a first transversely extending swivelling axis on the cartridge and about a second swivelling axis arranged to be-rotatable thereto by 90° and extending in a longitudinal direction between a tongue and a rectangular plate comprising the plate-shaped elements.

3. Cover device according to claim 1, wherein each of the at least two plate-shaped elements comprise a finger-shaped tongue extending in a longitudinal direction of the vehicle, between one side of the backrest as well as the side paneling and an adjoining rectangular cover plate between the cartridge and a rear wall of the backrest.

4. Cover device according to claim 3, wherein the plate-shaped elements are swivellable at a free end of the cartridge about a first transversely extending swivelling axis on the cartridge and about a second swivelling axis arranged to be rotatable thereto by 90° and extending in a longitudinal direction between a tongue and a rectangular plate comprising the plate-shaped elements.

5. Cover device according to claim 1, wherein, between the plate-shaped elements of each side of the vehicle, a transverse cover strip is provided for a gap between a vertical separating wall and the cartridge.

6. Cover device according to claim 5, wherein the plate-shaped elements are swivellable at a free end of the cartridge about a first transversely extending swivelling axis on the cartridge and about a second swivelling axis arranged to be rotatable thereto by 90° and extending in a longitudinal direction between a tongue and a rectangular plate comprising the plate-shaped elements.

7. Cover device according to claim 6, wherein each of the at least two plate-shaped elements comprise a finger-shaped tongue extending in a longitudinal direction of the vehicle, between one side of the backrest as well as the side paneling and an adjoining rectangular cover plate between the cartridge and a rear wall of the backrest.

8. Cover device according to claim 2, wherein film hinges constitute the swivelling axes at the connection to the cartridge and between the finger-shaped tongue and the rectangular plate.

9. Cover device according to claim 8, wherein each of the at least two plate-shaped elements comprise a finger-shaped tongue extending in a longitudinal direction of the vehicle, between one side of the backrest as well as the side paneling and an adjoining rectangular cover plate between the cartridge and a rear wall of the backrest.

10. Cover device according to claim 9, wherein, between the plate-shaped elements of each side of the vehicle, a transverse cover strip is provided for a gap between a vertical separating wall and the cartridge.

11. Cover device according to claim 6, wherein the rectangular plate is provided with a weakening depression with respect to the cover strip.

12. Cover device according to claim 11, wherein film hinges constitute the swivelling axes at the connection to the cartridge and between the finger-shaped tongue and the rectangular plate.

* * * * *